US010511974B2

(12) United States Patent
Skvortsov et al.

(10) Patent No.: US 10,511,974 B2
(45) Date of Patent: Dec. 17, 2019

(54) SYSTEM AND METHOD OF IDENTIFYING POTENTIALLY DANGEROUS DEVICES DURING THE INTERACTION OF A USER WITH BANKING SERVICES

(71) Applicant: AO Kaspersky Lab, Moscow (RU)

(72) Inventors: Vladimir A. Skvortsov, Moscow (RU); Evgeny B. Kolotinsky, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 198 days.

(21) Appl. No.: 15/695,253

(22) Filed: Sep. 5, 2017

(65) Prior Publication Data

US 2019/0053053 A1 Feb. 14, 2019

(30) Foreign Application Priority Data

Aug. 10, 2017 (RU) .................................. 2017128538

(51) Int. Cl.
  *H04L 29/06* (2006.01)
  *H04W 12/08* (2009.01)
  *G06F 21/56* (2013.01)
  *G06F 21/57* (2013.01)

(52) U.S. Cl.
  CPC .......... *H04W 12/08* (2013.01); *G06F 21/566* (2013.01); *G06F 21/577* (2013.01); *H04L 63/1416* (2013.01); *G06F 2221/2101* (2013.01)

(58) Field of Classification Search
  CPC .... H04W 12/08; G06F 21/577; G06F 21/566; G06F 2221/2101; H04L 63/1416
  See application file for complete search history.

(56) References Cited

U.S. PATENT DOCUMENTS

| 7,712,136 | B2 * | 5/2010 | Sprosts | G06Q 10/107 726/24 |
| 8,214,904 | B1 | 7/2012 | Doukhvalov et al. | |
| 8,738,721 | B1 | 5/2014 | Smirnov et al. | |
| 8,918,883 | B1 * | 12/2014 | Boyle | G06F 21/577 726/25 |
| 9,323,928 | B2 * | 4/2016 | Agarwal | G06F 21/55 |
| 10,163,329 | B1 * | 12/2018 | Jensen | G08B 25/10 |
| 10,192,058 | B1 * | 1/2019 | Jalil | G06F 21/577 |
| 2009/0325615 | A1 * | 12/2009 | McKay | H04L 63/02 455/466 |
| 2014/0004829 | A1 * | 1/2014 | Rieger | H04W 12/12 455/411 |
| 2014/0283061 | A1 | 9/2014 | Quinlan et al. | |

(Continued)

*Primary Examiner* — John B King
(74) *Attorney, Agent, or Firm* — Arent Fox LLP; Michael Fainberg

(57) ABSTRACT

Disclosed are systems and methods for identifying potentially dangerous devices during the interaction of a user with banking services. When there are interactions between a user's device(s) and banking services, the described technique acquires a digital fingerprint of the user device. That digital fingerprint indicates at least one characteristic of the user device. Clusters associated with the user device are created based on the at least one characteristic of the user device. Each cluster is associated with a corresponding threat degree. In response to determining that the user device is a threat risk based on the one or more generated clusters, transactions being carried out between the user device and the banking services may be blocked.

21 Claims, 3 Drawing Sheets

(56) References Cited

U.S. PATENT DOCUMENTS

| | | |
|---|---|---|
| 2014/0289852 A1 | 9/2014 | Evans et al. |
| 2015/0015805 A1 | 1/2015 | Etchegoyen |
| 2015/0135262 A1* | 5/2015 | Porat .................... G06F 21/552 726/1 |
| 2015/0163121 A1 | 6/2015 | Mahaffey et al. |
| 2015/0205965 A1* | 7/2015 | Kilgallon ............. G06F 21/577 726/25 |
| 2015/0229664 A1 | 8/2015 | Hawthorn et al. |
| 2015/0324802 A1 | 11/2015 | Kolkowitz et al. |
| 2015/0341389 A1* | 11/2015 | Kurakami ............... H04L 63/20 726/1 |
| 2016/0092684 A1* | 3/2016 | Langton ................ G06F 21/567 726/23 |
| 2018/0077195 A1* | 3/2018 | Gathala ............... H04L 63/1433 |

* cited by examiner

SYSTEM AND METHOD OF IDENTIFYING POTENTIALLY DANGEROUS DEVICES DURING THE INTERACTION OF A USER WITH BANKING SERVICES

CROSS-REFERENCE TO RELATED APPLICATIONS

The present disclosure claims benefit of priority under 35 U.S.C. 119(a)-(d) to a Russian Application No. 2017128538 filed on Aug. 10, 2017, which is incorporated by reference herein.

FIELD OF TECHNOLOGY

The present disclosure relates generally to the field of computer security, more specifically to systems and methods of identifying potentially dangerous devices during the interaction of a user with banking services.

BACKGROUND

At present, the realm of banking services has expanded significantly. The user (bank customer) is presented with new possibilities for interacting with the bank and new methods of payment and transfer of funds. A multitude of payment systems, plastic cards, and banking services (bank services are often called remote banking services) allow the user to perform various transactions by means of computing devices. Online and mobile banking are making it possible to carry out monetary transactions without the use of a plastic card or bank account details.

Moreover, various mechanisms exist for protecting the user's resources against access by third parties. When the user is working with online banking, a method such as two-factor authentication is often used. After entering the authentication data (such as a login and password, which might become accessible to third parties) in the browser at the bank site, the bank sends the user on their mobile telephone a message containing, for example, an additional verification code, which needs to be entered in a special field.

However, it should be noted that there are many attacks which employ vulnerable aspects in the interaction of the user with banking services, which are carried out by hackers in order to gain access to the user's funds. Such attacks are often called fraud. Thus, for example, with the aid of phishing sites it is possible to obtain the login and password for access to online banking. Malicious software for mobile devices allows hackers to conduct transactions with confirmation of which the user is unaware.

Systems and methods are known which use a so-called fingerprint of the user's device for protecting the user from fraudulent activity. The user in the general case uses the same devices, each device containing a particular set of software and attributes which are known to the bank. If the software set is changed on the device, or if the device itself is changed, there is a high probability that fraudulent activity is occurring. When fraudulent activity is carried out on a device, that device is then considered to be dangerous.

However, identical devices in different regions employ a different set of programs, firmware, and browsers for access to online banking. The known systems and methods of comparing fingerprints of devices only identify a certain number of dangerous devices, but are not able to identify potentially dangerous devices in dependence on different characteristics (such as the region of use of the device or the regional firmware of the device), nor are they able to identify devices if the fingerprint of such a device is not yet known (for example, a new device in the manufacturer's product line) and they do not make use of the expertise of firms engaging in the development of programs to ensure security (such as antivirus software).

SUMMARY

Thus, a system and method is disclosed herein for ensuring a safe interaction of a user with banking services, and more particularly, identifying potentially dangerous devices during the interaction of a user with banking services.

In one exemplary aspect, a method for identifying potentially dangerous devices during the interaction of a user with banking services comprises: responsive to detecting an interaction between a user device and banking services, acquiring a digital fingerprint associated with the user device, wherein the digital fingerprint indicates at least one characteristic of the user device; generating one or more clusters associated with the user device based on the at least one characteristic of the user device, wherein each cluster is associated with a corresponding threat degree; and responsive to determining that the user device is a threat risk based on the one or more generated clusters, blocking a transaction being carried out between the user device and the banking services during the interaction.

In one exemplary aspect, a method further comprises: acquiring data related to threat risk states associated with the user device.

In one exemplary aspect, a method further comprises: calculating each threat degree associated with a corresponding cluster of the one or more clusters, wherein each threat degree indicates a numerical quantity proportional to a frequency of occurrence of a threat risk state.

In one exemplary aspect, determining that the user device is a threat risk based on the one or more generated clusters further comprises: determining that the user device is associated with at least two clusters with threat degrees exceeding a threshold value.

In one exemplary aspect, determining that the user device is a threat risk based on the one or more generated clusters further comprises: determining a first threat degree of a first cluster of the generated clusters; determining a second threat degree of a second cluster of the generated clusters; and determining that an average of the first and second threat degrees exceeds the threshold value, wherein the first threat degree does not individually exceed the threshold value.

In one exemplary aspect, a method further comprises: the first and second clusters are generated by clusterization of different characteristics of the user device.

In one exemplary aspect, a method further comprises: determining that the user device is a threat risk based on the one or more generated clusters further comprises: determining that an average of a product of a first threat degree and an associated weight value and a product of a second threat and an associated weight value exceeds the threshold value.

In one exemplary aspect, a system for identifying potentially dangerous devices during the interaction of a user with banking services comprises: a storage device for storing a database; and a hardware processor configured to: responsive to detecting an interaction between a user device and banking services, acquire a digital fingerprint associated with the user device, wherein the digital fingerprint indicates at least one characteristic of the user device; generate one or more clusters associated with the user device based on the at least one characteristic of the user device, wherein each cluster is associated with a corresponding threat degree; and responsive to determining that the user device is a threat risk based on the one or more generated clusters, block a transaction being carried out between the user device and the banking services during the interaction.

In one exemplary aspect, a non-transitory computer readable medium comprising computer executable instructions for identifying potentially dangerous devices during the interaction of a user with banking services, including instructions for: responsive to detecting an interaction between a user device and banking services, acquiring a digital fingerprint associated with the user device, wherein the digital fingerprint indicates at least one characteristic of the user device; generating one or more clusters associated with the user device based on the at least one characteristic of the user device, wherein each cluster is associated with a corresponding threat degree; and responsive to determining that the user device is a threat risk based on the one or more generated clusters, blocking a transaction being carried out between the user device and the banking services during the interaction.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for identification of potentially dangerous devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
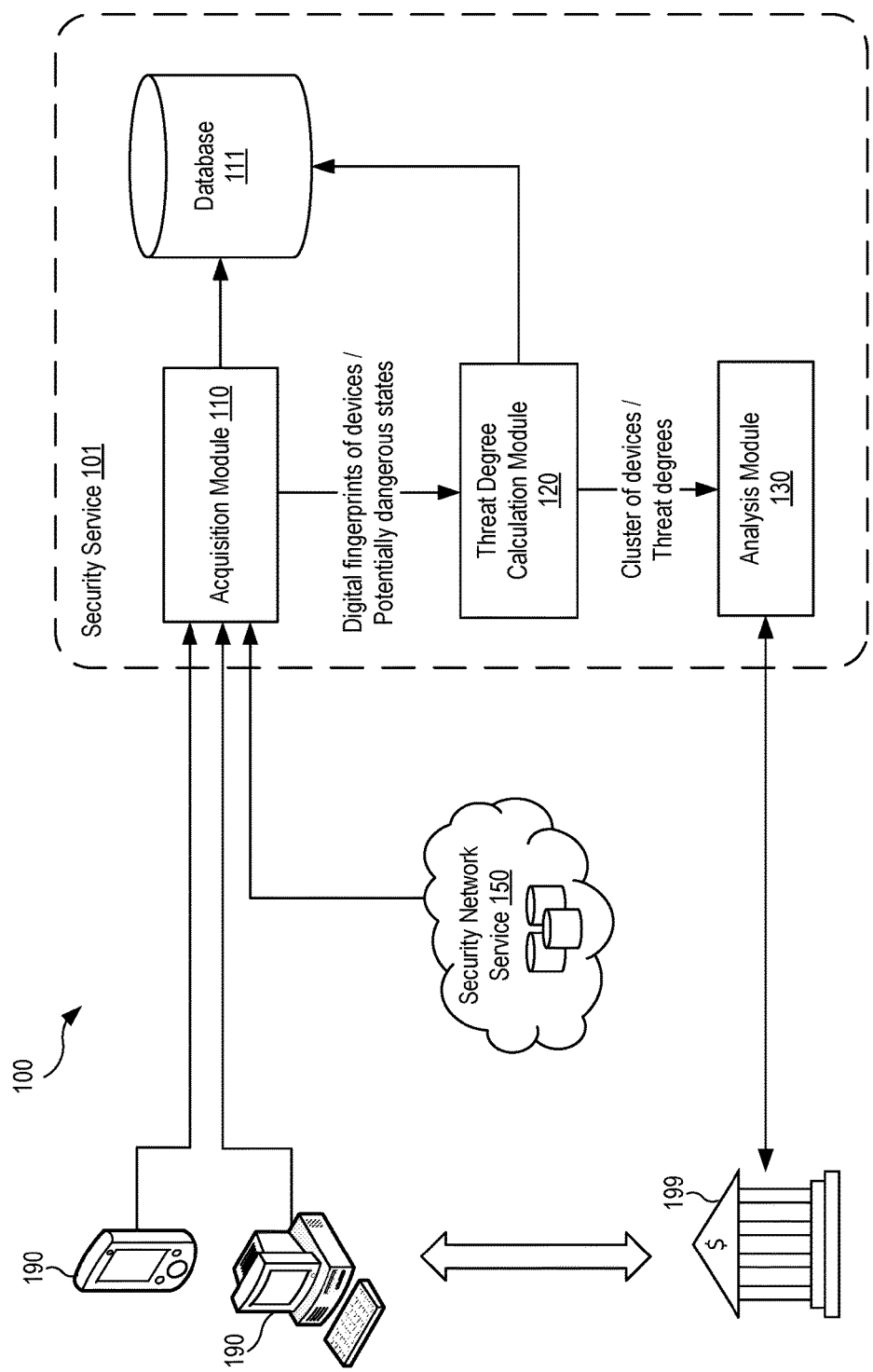
FIG. 1 is a block diagram illustrating a system for identification of potentially dangerous devices according to an exemplary aspect.

FIG. 1 is a block diagram illustrating a system 100 for identification of potentially dangerous devices according to an exemplary aspect. The system 100 is configured to identify potentially dangerous devices 190 during online access to banking services 199. The system 100 may include a security service 101 having an acquisition module 110, a threat degree calculating module 120, and an analysis module 130.

The device 190 in the context of the present disclosure is a software execution environment which is implemented on a computing device. For example, the device 190 may include a web browser application executing on a computer, for accessing a website provided by the banking service 199. In another example, the device 190 may include a bank application executing on a mobile device (e.g., smartphone, tablet) configured to accessing banking services 199.

As referred to herein, a potentially dangerous device (also referred to herein as a threat risk) is a device 190 whose probability of fraud during online access to banking services 199 (i.e., online banking) is higher than a threshold value. For example, the system 100 may identify devices 190 that are mobile devices, smartphones, or tablet computers with root access; mobile devices, smartphones, personal computers, and notebooks with a high frequency of infection for a certain region; mobile devices, smartphones, personal computers, and notebooks with a high frequency of infection for different regions; and different combinations of potentially dangerous states and clusters of devices 190.

In one aspect, the acquisition module 110 is configured to acquire digital fingerprints (also called impressions) of devices 190. In the general case, the fingerprint contains characteristics of the device 190. For example, the characteristics of the device 190 may include an identifier of the operating system under whose control the device 190 is running (e.g., version number, serial number). In some aspects, the fingerprint associated with the device may indicate a geographical location of the device, for example, using a geolocation of the device 190, or regional characteristics of the firmware of the device 190 (such as continent/country/city). In some aspects, the fingerprint associated with the device may include an account identifier (such as the Microsoft®, Google®, or Apple® account identifier). In some aspects, the fingerprint associated with the device may indicate information about the state of software executing on the device 190, such as information on whether the device 190 (the software execution environment) is running within a virtual machine or emulator, a web browser application version, plug-ins installed in the browser of the device 190, vulnerable applications installed on the device 190, and so forth.

In one aspect, the acquisition module 110 may be configured to acquire the characteristics by executing (e.g., in the browser on the device 190) a JavaScript script, wherein said script may be stored on the bank server and executed when the device 190 accesses the bank server. In yet another aspect, the acquisition module 110 may be configured to acquire the data using security applications (such as an antivirus application). In yet another aspect, the acquisition module 110 may be configured to acquire the characteristics associated with the device 190 using an application running on the device 190. For example, such an application may be configured to access banking services (such as the application "Sberbank-online") 199 and created with the use of a software development kit (SDK), provided for example by the manufacturer of the antivirus application (such as the Kaspersky Mobile Security SDK).

Besides acquiring the characteristics of the device 190 the acquisition module 110 may be further configured to obtain data related to potentially dangerous states of the device 190. The term "potentially dangerous states" may refer to states of the device 190 when a safe interaction of the user via the device 190 with the banking services 199 cannot be guaranteed. Examples of such states are given below.

In one aspect, a potentially dangerous state is the presence on the device 190 of root access, wherein the acquisition module 110 acquires information on the presence of root access on the device 190. It should be mentioned that even an antivirus application may not identify the activity of malicious software on a device 190 with root access. Therefore, such a state of the device 190 cannot guarantee a safe interaction of the user with the banking services 199 by means of the device 190.

In yet another aspect, a potentially dangerous state is an infection on the device 190, wherein the acquisition module 110 obtains information as to the presence of an infection on the device 190 (for example, the acquisition module discovers the activity of malicious programs). Information as to the infection of the device 190 may be obtained both at the time of the user accessing the banking services 199, and over the course of a period of time when the user is not yet interacting with the banking services 199 (for example, such information may be acquired by a service of the acquisition module 110 running in the background).

In one aspect, the acquisition module 110 obtains from the bank or an outside organization information about an attack on banking services 199 carried out from the device 190 (for example, it receives from Kaspersky Laboratory information on attacks on banking services 199 identified with the aid of Kaspersky Fraud Prevention, KFP). In such a case, the fact of the attack is also a potentially dangerous state.

In yet another aspect, the acquisition module 110 obtains information from the bank or an outside organization as to the device 190 being compromised by any other known suitable method. For example, the acquisition module 110 may receive data on an attack or a compromised system from a security network 150. The security network 150 may be a cloud-based service that compiles and provides data related to new or past threats, applications' reputation data, websites' reputation data, and other data related to detected threats and suspicious activities. An example of a security network may be the Kaspersky Security Network (KSN) made available by Kaspersky Labs®.

The data acquired by the acquisition module 110 about the device 190 is sent to the threat degree calculating module 120. In one variant aspect, the data acquired by the acquisition module 110 about the device 190 is saved in a database 111.

The threat degree calculating module 120 may be running on a remote server (or on a distributed system of servers) or as a cloud service and is configured to calculate threat degrees on the basis of the data obtained from the acquisition module 110 or from the database 111.

The threat degree calculating module 120 calculates the threat degrees (threat factors). The threat degree may be represented as a numerical quantity. In the general case, the threat degree is calculated on the basis of the frequency of occurrence of a potentially dangerous state. The threat degree is higher the more often the potentially dangerous state is encountered. In one aspect, the threat degree is calculated in the range of 0 (guaranteed safe device) to 1 (guaranteed malicious device).

In one aspect, the threat degree calculating module 120 creates clusters (performs a clusterization) of devices 190 on the basis of at least one device characteristic obtained when acquiring the fingerprint of the device 190. In one aspect, the clusterization is done on the basis of several of the mentioned acquired characteristics of the devices 190. Thus, the threat degree may be calculated both for an individual device 190 and for a cluster of devices 190. Moreover, the threat degree may be calculated individually both for each known potentially dangerous state (for example, the frequency of presence of root access on the device 190), and for any one of their combinations (for example, the frequency of presence of root access on the device 190 and the frequency of attacks on banking services from the device 190).

Taking the above into account, it is possible to calculate several threat degrees for each device 190 or cluster of devices 190. The threat degree for a cluster may be calculated by any known suitable method. In one aspect, the threat degree of a cluster is one of the measures of the central trend (arithmetic mean) of the threat degrees of all the devices 190 entering into the cluster. In another aspect, the threat degree of a cluster is calculated as the arithmetic mean of the threat degrees multiplied by a coefficient which is higher the less time has passed since the last known compromise of one of the devices 190.

In one aspect, the threat degree calculating module 120 may determine a threat degree to a device 190 based on characteristics associated with the device indicating a particular geographical location and/or other factors associated with higher or lower levels of threat risk. For example, a device 190 with firmware for China, to be used in China, has high threat degrees for root access (installed by default in the firmware by the manufacturer) and for vulnerable applications installed (there are many preinstalled applications in the firmware, for example, advertising and performing backup data copying from the mentioned devices to Chinese servers). The very same device 190 with firmware for China, but used in the USA, has only a high threat degree for root access, since the preinstalled vulnerable applications are not connected to Chinese servers and do not manifest their activity. This same device with firmware for the USA has low threat degrees for root access and preinstalled vulnerable applications, since the firmware does not contain root access and preinstalled vulnerable applications, and only a small number of users independently obtain root access on the device 190 and install the mentioned applications.

In some aspects, the threat degree calculating module 120 may ignore clusters with a relatively small threat degree during the analysis of the devices 190. For example, the threat degree calculating module 120 may ignore a cluster based on a threshold value of multiple times (e.g., 5 times) higher than the threat degree of the cluster. For example, the cluster of devices 190 containing a certain well-regarded application (e.g., Google Chrome®) is not potentially dangerous (such a clustering is too generalized and not amenable to identifying dangerous devices 190, so it makes no sense to consider such a cluster).

The data calculated by the threat degree calculating module 120 about the device 190 is sent to the analysis module 130. In one aspect, the clusters created by the threat degree calculating module 120 and the threat degrees calculated are saved in the database 111.

The analysis module 130 may be executed on a remote server (or a distributed system of servers) or as a cloud service and is configured to identify potentially dangerous devices on the basis of the data obtained from the threat degree calculating module 120 or from the database 111.

Among the devices 190 and the clusters created for the devices 190 the analysis module 130 identifies potentially dangerous devices 190, specifically devices 190 with at least one high threat degree. In the general case, the threat degree is compared to a previously determined threshold value. The threshold value may be obtained automatically on the basis of statistical data or with the involvement of a computer security expert, and also on the basis of data on past incidents from the bank or data on compromised systems from a security network 150.

In one aspect, the analysis module 130 identifies the potentially dangerous device 190 that corresponds to at least two clusters of devices with threat degrees greater than a threshold value, each cluster being created on the basis of different characteristics of the devices. Thus, for example, cluster A has a threat degree #1, which is higher than the threshold value, cluster A being obtained by clusterization of characteristic #1. Cluster B has a threat degree #2, which is also higher than the threshold value, cluster B being obtained by clusterization of characteristic #2. The device 190 corresponds to both cluster A and cluster B.

In another aspect, the analysis module 130 may identify, as potentially dangerous, a device associated with multiple clusters based on the threat degrees of the multiple clusters, even though the threat degrees of the clusters are not individually indicative of a sufficient threat risk. To do so, the analysis module 130 may designate, for each threat degree, a numerical coefficient (weight), and may identify a potentially dangerous device as the arithmetic mean of the threat degrees of the clusters, multiplied by the mentioned coefficients. For example, cluster A has a threat degree #1, which is lower than the threshold value, and coefficient #1, cluster A being obtained by clusterization of characteristic #1. Cluster B has a threat degree #2, which is likewise lower than the threshold value, and a coefficient #2, cluster B being obtained by clusterization of characteristic #2. The device 190 corresponds to both cluster A and cluster B. In this case, it is possible that, as shown by the relationship depicted in Equation (1):

$$\frac{(ThreatDegree_1 * Coeff_1) + (ThreatDegree_2 * Coeff_2)}{2} > threshold, \quad (1)$$

that is, a device falling within clusters A and B is potentially dangerous, while the threat degrees of clusters A and B separately do not exceed the threshold value.

Examples of threat risk devices 190 may include mobile devices, smartphones, or tablet computers with root access. That is, the analysis module 130 may conclude that if a cluster of devices 190 associated a particular model of a particular manufacturer contains 70% of devices 190 with root access, this may indicate that the device from the factory has firmware in which root access is present. In another example, threat risk devices may include mobile devices, smartphones, personal computers, and notebooks with a high frequency of infection for a certain region. In this case, the analysis module 130 may conclude that this may indicate that the device 190 from the factory has firmware with embedded malicious software, or the device 190 is being used in a region with no antivirus application installed on it. In another example, the threat risk devices may be comprised of mobile devices, smartphones, personal computers, and notebooks with a high frequency of infection for different regions. It has been determined that this may indicate that the device 190 has a hidden/critical vulnerability making unauthorized access to the device 190 easier than with other devices 190. It is noted that other different combinations of potentially dangerous states and clusters of devices 190 may be used with aspects of the present disclosure.

The foregoing remarks make it possible to expand the family of potentially dangerous devices regardless of the manufacturer or the particular model of the devices 190 (for example, all devices 190 of any given manufacturer with any given regional firmware in which there is root access and an application attacking banking services, according to data from a security network 150, will be assigned to the potentially dangerous category).

In the general case, after identifying potentially dangerous devices 190 by the above-described method, the analysis module 130 notifies the access systems and/or decision making systems (in one aspect, such systems are implemented at the bank side, as bank security services 199). The fact of attempted access (such as an attempt to get into the system) from a potentially dangerous device 190 does not necessarily indicate an attack, but it may be a risk factor which is processed in the decision making system in a special way (for example, an increased logging level, a two-factor authorization, limited authority, and so on).

In one aspect, the analysis module 130 may block a transaction being carried out during an interaction with banking services 199 from a potentially dangerous device 190 by any suitable technique.

Moreover, the threat degrees make it possible to assess whether the probability of performing an attack is higher (and how much so) from a given particular device 190 (or from a device 190 having a particular set of characteristics according to which clusters are constructed) than from devices 190 not having those characteristics.

Figure 2:
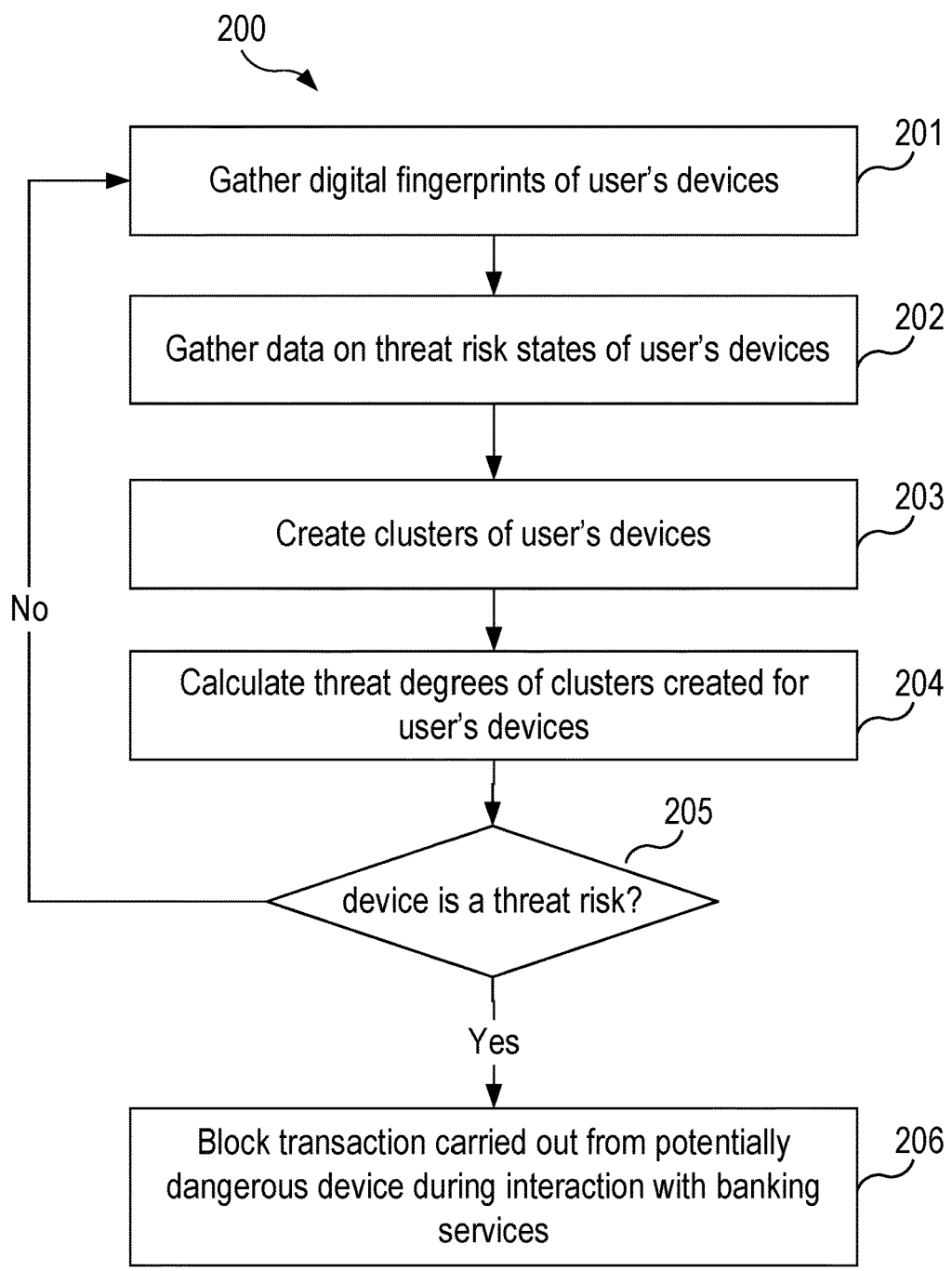
FIG. 2 is a flowchart illustrating a method for identification of potentially dangerous devices according to an exemplary aspect.

FIG. 2 is a flowchart illustrating a method 200 for identification of potentially dangerous devices according to an exemplary aspect. It is noted that the following description of the exemplary method makes reference to the system and components described above.

In step 201, the acquisition module 110 is used to acquire the digital fingerprints of a user's devices 190, wherein the fingerprint contains at least one characteristic of the aforementioned user's device. In some aspects, the digital fingerprint of the user device may be acquired in response to detecting an interaction between the user's device 190 and the bank services 199. The characteristics of the device 190 may include an identifier of the operating system under whose control the device is running, a location of the device, regional characteristics of the firmware of the device. In other aspects, the characteristics of the device 190 may include an account identifier (e.g., Google ID or Apple ID), an indication of whether the device is running within a virtual machine or emulator, the browser version, the plug-ins installed in the browser of the device, and any vulnerable applications installed on the device;

In step 202, the acquisition module 110 may acquire data related to threat risk states of the aforementioned user's device. In one variant aspect, a threat risk state may be indicated by the presence of root access on the device 190. In yet another variant aspect, information is acquired on the threat risk states of the user's device 190 from a security network 150. The data acquired by the acquisition module 110 about the device 190 may be saved in a database 111.

In step 203, the threat degree calculating module 120 may generate one or more clusters of the user's devices 190 on the basis of at least one characteristic of the devices obtained during the acquiring of the fingerprint of the device 190. In some aspects, the threat degree calculating module 120 may create a first cluster and a second cluster, wherein the different clusters are generated by clusterization of different characteristics of the user device. For example, one cluster may be based on the regional characteristics of the firmware installed on the respective user devices, while another cluster may be based on the installed web browser version.

In step 204, the threat degree calculating module 120 may calculate the threat degree associated with each of the created clusters of the user's devices 190. In some aspects, the threat degree may be a numerical quantity proportional to the frequency of occurrence of the potentially dangerous state. In one variant aspect, the clusters created by the threat degree calculating module 120 and the calculated threat degrees are saved in the database 111.

In step 205, the analysis module 130 may determine whether the user device is a threat risk based on the one or more generated clusters. In some aspects, the analysis module 130 may identify a potentially dangerous device 190, where the potentially dangerous device 190 corresponds to at least two clusters of devices 190 with threat degrees higher than a threshold value, each cluster being created on the basis of different characteristics of devices. In some aspects, the analysis module 130 may determine that an average of a first threat (of a first cluster) and a second threat degree (of a second cluster) exceeds the threshold value, even though the first threat degree does not individually exceed the threshold value. In another aspect, the analysis module 130 may determine that an average of a product of a first threat degree and an associated weight value and a product of a second threat and an associated weight value exceeds the threshold value, for example, as represented by Equation (1) above.

If so, in step 206, the analysis module 130 may block a transaction being carried out from the threat risk device 190 during an interaction with banking services 199. Otherwise, the operations may return to step 201 in which the system 100 analysis and acquires data about a given user device 190.

Figure 3:
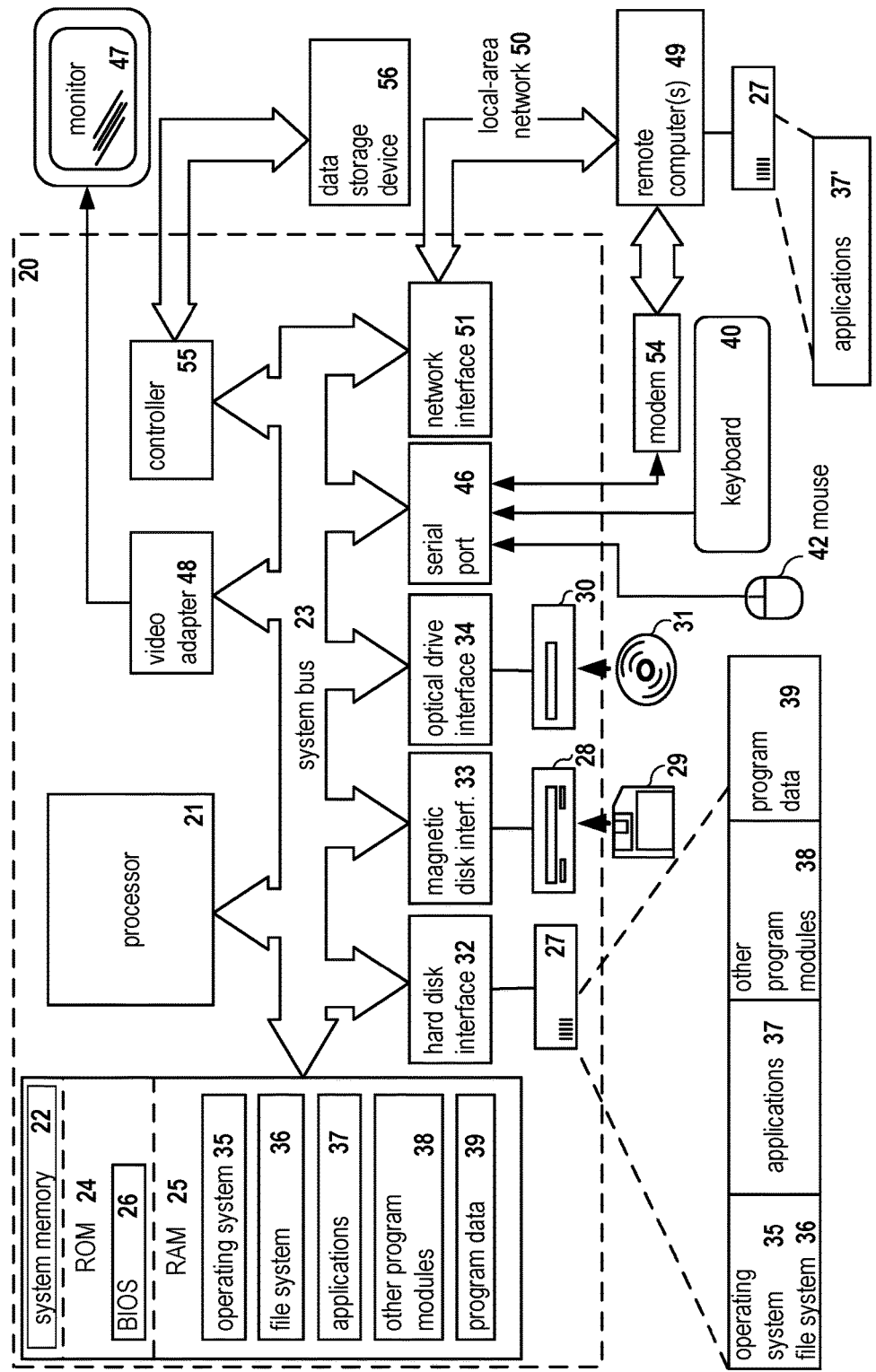
FIG. 3 shows an example of a general-purpose computer system on which the present invention may be implemented.

FIG. 3 is a block diagram illustrating a general-purpose computer system 20 on which aspects of systems and methods for identifying potentially dangerous devices during the interaction of a user with banking services may be implemented in accordance with an exemplary aspect. It should be noted that the computer system 20 can correspond to a physical server on which the security service 101 may be executing, as well as user devices 190, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for identifying potentially dangerous devices during the interaction of a user with banking services, wherein the method comprises:
    responsive to detecting an interaction between a user device and banking services, acquiring a digital fingerprint associated with the user device, wherein the digital fingerprint indicates at least one characteristic of the user device;
    generating one or more clusters associated with the user device based on the digital fingerprint, wherein each of the one or more clusters are associated with at least one characteristic and a corresponding threat degree;
    determining that the user device is a threat risk when a threat degree of a predetermined quantity of the one or more clusters is greater than a predetermined threshold, wherein at least one cluster with a threat degree higher than the predetermined threshold comprises characteristics of a firmware of the device associated with a geographic region and the user device being located in the same geographic region; and
    responsive to determining that the user device is a threat risk based on the one or more generated clusters, blocking a transaction being carried out between the user device and the banking services during the interaction.

2. The method of claim 1, further comprising:
    acquiring data related to threat risk states associated with the user device.

3. The method of claim 1, further comprising:
    calculating each threat degree associated with a corresponding cluster of the one or more clusters, wherein each threat degree indicates a numerical quantity proportional to a frequency of occurrence of a threat risk state.

4. The method of claim 1, wherein determining that the user device is a threat risk based on the one or more generated clusters further comprises:
    determining that the user device is associated with at least two clusters with threat degrees exceeding a threshold value.

5. The method of claim 1, wherein determining that the user device is a threat risk based on the one or more generated clusters further comprises:
    determining a first threat degree of a first cluster of the generated clusters;
    determining a second threat degree of a second cluster of the generated clusters; and
    determining that an average of the first and second threat degrees exceeds the threshold value, wherein the first threat degree does not individually exceed the threshold value.

6. The method of claim 5, wherein the first and second clusters are generated by clusterization of different characteristics of the user device.

7. The method of claim 1, wherein determining that the user device is a threat risk based on the one or more generated clusters further comprises:
    determining that an average of a product of a first threat degree and an associated weight value and a product of a second threat and an associated weight value exceeds the threshold value.

8. A system for identifying potentially dangerous devices during the interaction of a user with banking services, wherein the system comprises:
    a storage device for storing a database; and
    a hardware processor configured to:
        responsive to detecting an interaction between a user device and banking services, acquire a digital fingerprint associated with the user device, wherein the digital fingerprint indicates at least one characteristic of the user device;
        generate one or more clusters associated with the user device based on the digital fingerprint, wherein each of the one or more clusters are associated with at least one characteristic and a corresponding threat degree;
        determine that the user device is a threat risk when a threat degree of a predetermined quantity of the one or more clusters is greater than a predetermined threshold, wherein at least one cluster with a threat degree higher than the predetermined threshold comprises characteristics of a firmware of the device associated with a geographic region and the user device being located in the same geographic region; and responsive to determining that the user device is a threat risk based on the one or more generated clusters, block a transaction being carried out between the user device and the banking services during the interaction.

9. The system of claim 8, wherein the generated clusters and associated threat degrees are stored in the database.

10. The system of claim 8, wherein the processor is further configured to:

calculate each threat degree associated with a corresponding cluster of the one or more clusters, wherein each threat degree indicates a numerical quantity proportional to a frequency of occurrence of a threat risk state.

11. The system of claim 8, wherein the processor is configured to determine that the user device is a threat risk based on the one or more generated clusters is further configured to:

determine that the user device is associated with at least two clusters with threat degrees exceeding a threshold value.

12. The system of claim 8, wherein the processor is configured to determine that the user device is a threat risk based on the one or more generated clusters is further configured to:

determine a first threat degree of a first cluster of the generated clusters;

determine a second threat degree of a second cluster of the generated clusters; and determine that an average of the first and second threat degrees exceeds the threshold value, wherein the first threat degree does not individually exceed the threshold value.

13. The system of claim 12, wherein the first and second clusters are generated by clusterization of different characteristics of the user device.

14. The system of claim 8, wherein the processor is configured to determine that the user device is a threat risk based on the one or more generated clusters is further configured to:

determine that an average of a product of a first threat degree and an associated weight value and a product of a second threat and an associated weight value exceeds the threshold value.

15. A non-transitory computer readable medium comprising computer executable instructions for identifying potentially dangerous devices during the interaction of a user with banking services, including instructions for:

responsive to detecting an interaction between a user device and banking services, acquiring a digital fingerprint associated with the user device, wherein the digital fingerprint indicates at least one characteristic of the user device;

generating one or more clusters associated with the user device based on the digital fingerprint, wherein each of the one or more clusters are associated with at least one characteristic and a corresponding threat degree;

determining that the user device is a threat risk when a threat degree of a predetermined quantity of the one or more clusters is greater than a predetermined threshold, wherein at least one cluster with a threat degree higher than the predetermined threshold comprises characteristics of a firmware of the device associated with a geographic region and the user device being located in the same geographic region; and responsive to determining that the user device is a threat risk based on the one or more generated clusters, blocking a transaction being carried out between the user device and the banking services during the interaction.

16. The non-transitory computer readable medium of claim 15, further comprising instructions for:

acquiring data related to threat risk states associated with the user device.

17. The non-transitory computer readable medium of claim 15, further comprising instructions for:

calculating each threat degree associated with a corresponding cluster of the one or more clusters, wherein each threat degree indicates a numerical quantity proportional to a frequency of occurrence of a threat risk state.

18. The non-transitory computer readable medium of claim 15, wherein the instructions for determining that the user device is a threat risk based on the one or more generated clusters further comprises instructions for:

determining that the user device is associated with at least two clusters with threat degrees exceeding a threshold value.

19. The non-transitory computer readable medium of claim 15, wherein the instructions for determining that the user device is a threat risk based on the one or more generated clusters further comprises instructions for:

determining a first threat degree of a first cluster of the generated clusters;

determining a second threat degree of a second cluster of the generated clusters; and determining that an average of the first and second threat degrees exceeds the threshold value, wherein the first threat degree does not individually exceed the threshold value.

20. The non-transitory computer readable medium of claim 19, wherein the first and second clusters are generated by clusterization of different characteristics of the user device.

21. The non-transitory computer readable medium of claim 15, wherein instructions for determining that the user device is a threat risk based on the one or more generated clusters further comprises instructions for:

determining that an average of a product of a first threat degree and an associated weight value and a product of a second threat and an associated weight value exceeds the threshold value.

* * * * *